(12) United States Patent
Hinterberger et al.

(10) Patent No.: US 11,621,558 B2
(45) Date of Patent: *Apr. 4, 2023

(54) ELECTRIC ENERGY SUPPLY DEVICE COMPRISING A BUSBAR MATRIX, AND METHOD FOR OPERATING THE ENERGY SUPPLY DEVICE

(71) Applicant: AUDI AG, Ingolstadt (DE)

(72) Inventors: Michael Hinterberger, Großmehring (DE); Berthold Hellenthal, Schwanstetten (DE); André Blum, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 143 days.

This patent is subject to a terminal disclaimer.

(21) Appl. No.: 16/625,917

(22) PCT Filed: May 18, 2018

(86) PCT No.: PCT/EP2018/063110
§ 371 (c)(1),
(2) Date: Dec. 23, 2019

(87) PCT Pub. No.: WO2018/233954
PCT Pub. Date: Dec. 27, 2018

(65) Prior Publication Data
US 2020/0176994 A1    Jun. 4, 2020

(30) Foreign Application Priority Data

Jun. 23, 2017   (DE) .......................... 102017210617.4

(51) Int. Cl.
*B60L 1/00*     (2006.01)
*H02J 3/32*     (2006.01)
(Continued)

(52) U.S. Cl.
CPC .................. *H02J 1/08* (2013.01); *B60L 1/00* (2013.01); *H02J 1/14* (2013.01); *H02J 3/28* (2013.01);
(Continued)

(58) Field of Classification Search
CPC .......... B60L 58/21; B60L 50/40; B60L 50/71; H02M 7/4835; H02M 1/008;
(Continued)

(56) References Cited

U.S. PATENT DOCUMENTS 7,087,327 B2    8/2006  Pearson
10,797,487 B2 * 10/2020  Lu ......................... H02M 7/483
(Continued)

FOREIGN PATENT DOCUMENTS

DE    10010985 A1 *  9/2001  ........ H01M 8/04619
DE    10010985 A1     9/2001
(Continued)

OTHER PUBLICATIONS

German Examination Report dated Jun. 17, 2021, in connection with corresponding German Application No. 102017210617.4 (10 pages, including machine-generated English translation).

(Continued)

*Primary Examiner* — Elim Ortiz
(74) *Attorney, Agent, or Firm* — Maier & Maier, PLLC

(57) ABSTRACT

The disclosure relates to an electrical energy supply device having usage units, wherein each usage unit is designed to generate or to buffer electrical energy. The disclosure proposes that the energy supply device carries out an energy exchange through a busbar assembly, wherein busbars of the busbar assembly form a busbar matrix, and in the energy supply device the usage units are divided up into strands and in each strand the usage units are hooked up in a series circuit and the series circuit is connected across a DC voltage converter to one strand end of the strand and each (Continued)

strand end of the strand is connected across a respective galvanically separable switching unit.

8 Claims, 2 Drawing Sheets

(51) Int. Cl.
| | |
|---|---|
| *H02J 3/38* | (2006.01) |
| *H02J 7/00* | (2006.01) |
| *H02J 1/08* | (2006.01) |
| *H02J 1/14* | (2006.01) |
| *H02J 3/28* | (2006.01) |
| *B60L 50/60* | (2019.01) |
| *B60L 50/70* | (2019.01) |

(52) U.S. Cl.
CPC .............. *H02J 3/322* (2020.01); *H02J 3/381* (2013.01); *H02J 7/0013* (2013.01); *B60L 50/60* (2019.02); *B60L 50/70* (2019.02); *H02J 2300/24* (2020.01); *H02J 2300/30* (2020.01)

(58) Field of Classification Search
CPC ... H02M 1/0074; H02M 1/0095; Y02T 90/14; Y02T 10/70; Y02T 10/7072; Y02E 10/56; H01M 8/249; H02J 7/0024; H02J 7/34; H02J 1/08; H02J 1/10; H02J 2300/30; H02J 2300/24; H02J 3/381; H02J 7/0013; H02J 7/00; H02J 7/0018; H02J 7/0014; H02J 2207/20; H02J 7/02; H02J 7/007182; H02J 7/0025; H02J 7/0042; H02J 7/1423; H02J 7/345; H02J 9/061; H02J 7/00714; H02J 7/0045; H02J 7/0063; H02J 2207/40; H02J 7/00711; H02J 7/007; H02J 7/0036; H02J 1/082; H02J 2300/40; H02J 7/0027; H02J 7/14; H02J 2207/10; H02J 3/38
USPC .... 307/2, 6, 8, 9.1, 10.1, 16, 18, 19, 20, 21, 307/22, 25, 26, 29, 37, 38, 43, 45, 54, 48, 307/57, 58, 56, 66, 80; 318/8; 700/4, 700/20, 22, 286, 287, 288, 289, 90, 291, 700/292, 293, 294, 296, 298; 200/5 R, 200/18, 42.01; 361/189, 190, 621.628, 361/631, 632, 828, 837; 320/101, 116, 320/117, 118, 119, 120, 121, 122, 124, 320/125, 126, 140, 152, 151, 163, 165
See application file for complete search history.

(56) References Cited

U.S. PATENT DOCUMENTS

| | | | |
|---|---|---|---|
| 10,840,702 B2 * | 11/2020 | Ding ......................... | H02J 1/04 |
| 2006/0092583 A1 | 5/2006 | Alahmad et al. | |
| 2009/0066291 A1 | 3/2009 | Tien et al. | |
| 2013/0057210 A1 | 3/2013 | Nergaard et al. | |
| 2013/0069592 A1 * | 3/2013 | Bouman ............... | H02J 7/0027 320/109 |
| 2015/0061378 A1 * | 3/2015 | Nakagawa .............. | H02J 1/102 307/9.1 |
| 2016/0172862 A1 | 6/2016 | Nishigai | |
| 2016/0368392 A1 * | 12/2016 | Braun ..................... | H02M 7/44 |
| 2017/0133928 A1 * | 5/2017 | Hollung ................. | H02M 3/04 |
| 2017/0317500 A1 * | 11/2017 | Kumar .................... | G01R 31/42 |
| 2020/0001730 A1 * | 1/2020 | Gohla-Neudecker ..... | H02J 7/02 |

FOREIGN PATENT DOCUMENTS

| | | | | |
|---|---|---|---|---|
| DE | 102011054145 A1 | | 4/2012 | |
| DE | 102011056377 A1 | | 1/2013 | |
| DE | 102015202147 A1 | | 8/2016 | |
| DE | 102015216097 A1 * | | 3/2017 | ........... B60L 15/007 |
| DE | 102015216097 A1 | | 3/2017 | |
| DE | 102016223470 A1 | | 6/2017 | |
| DE | 112015003701 T5 | | 7/2017 | |
| EP | 2560264 A2 | | 2/2013 | |
| EP | 3038229 A1 | | 6/2016 | |
| WO | 2011145939 A2 | | 11/2011 | |
| WO | 2013021364 A1 | | 2/2013 | |

OTHER PUBLICATIONS

International Preliminary Report on Patentability with English-language translation of the Written Opinion dated Jan. 2, 2020 in corresponding International Application No. PCT/EP2018/063110; 8 pages.
German Examination Report dated Mar. 13, 2018 in corresponding German Application No. 102017210617.4; 20 pages; Machine translation attached.
International Search Report dated Aug. 9, 2018 and Written Opinion in corresponding International Application No. PCT/EP2018/063110; 21 pages; Machine translation attached.

* cited by examiner

ELECTRIC ENERGY SUPPLY DEVICE COMPRISING A BUSBAR MATRIX, AND METHOD FOR OPERATING THE ENERGY SUPPLY DEVICE

FIELD

The invention relates to an electrical energy supply device having a plurality of usage units. The energy supply device may be, for example, a stationary battery accumulator or a vehicle battery for an electric vehicle. Accordingly, the usage units may each be formed by a battery cell module. The energy supply device may comprise a busbar matrix, across which the usage units may be electrically connected optionally to an appliance connected to the energy supply device, in order to carry out an energy exchange with the appliance. The invention also includes a method for operating the energy supply device.

BACKGROUND

An energy supply device of the mentioned kind is known for example from U.S. Pat. No. 7,087,327 B2. This specifies that an energy supply device may comprise a series circuit of fuel cell stacks, which in total can provide an electrical voltage for an appliance connected to the energy supply device. Each fuel cell stack may be individually bridged electrically in the series circuit by a diode, so that in event of a defect the entire energy supply device is not blocked or shut down. There are replacement fuel cell stacks in the series circuit, so as to continue providing the voltage also when a fuel cell stack malfunctions. A replacement fuel cell stack remains unused until such time as it is needed on account of a defect in another fuel cell stack. In order to provide a larger operating current, a plurality of said series circuits can be connected in parallel. Switches are provided in order to set up a particular circuitry as fuel cell stacks. The drawback in this arrangement is that a control of the output current strength is only possible within each individual fuel cell stack because of the need for free configurability, which makes the energy supply device costly in its production.

Another energy supply device with a plurality of usage units in the form of energy storage elements is known from US 2006/0092583 A1. The individual energy storage elements can likewise be combined by means of a plurality of switches into different circuitry configurations. A galvanic separation between the individual storage elements is not provided.

SUMMARY

The problem which the invention proposes to solve is to provide a variably configurable electrical energy supply device for an energy exchange with an appliance.

The problem is solved by the subject matter of the independent patent claims. Advantageous modifications of the invention are described by the dependent patent claims, the following specification, and the figures.

Thanks to the invention, an electrical energy supply device is provided in which a plurality of usage units is provided. Each usage unit is designed to generate or buffer or dynamically redistribute electrical energy (e.g., like a capacitor). The energy supply device may be designed as a stationary energy storage or a mobile energy storage.

In order to design a flexible connection between an attached appliance and the individual usage units of the energy supply device, it is proposed according to the invention that the energy supply device carries out the energy exchange through a busbar assembly, wherein busbars of the busbar assembly form a busbar matrix. In other words, more than two busbars are provided, so that multiple different busbar pairs are possible for the transfer of a DC voltage between usage units and appliances connected to the energy supply device. Thus, at least three busbars, but preferably multiple busbars are provided for each plus potential and each minus potential or ground potential. DC voltage can then be transmitted by means of one of the busbar pairs to the appliance. In order to connect the usage units in flexible manner to the busbar matrix, theoretically a plurality of switches would be needed at the busbar matrix. But this is avoided according to the invention in that the usage units are divided up into strands and in each strand the usage units are hooked up in a series circuit. Each strand has two strand ends, namely, a plus end and a minus end. Each strand end is connected across a respective galvanically separable switching unit to the busbar assembly. A galvanically separable switching unit is a mechanical switching unit which may provide for example at least one contactor. Within the strand, the series circuit is connected across a DC voltage converter (DC/DC converter) to one of the strand ends. In general, the DC voltage converter may be a boost converter or a buck converter or a buck-boost converter. The DC voltage converter is preferably a buck converter. The series circuit can be connected directly to the other strand end.

The energy exchange between the energy supply device on the one hand and an appliance coupled to the energy supply device on the other hand may be controlled by a control device. The control device is designed to select one of the strands by a predetermined suitability criterion for the energy exchange and to connect each selected strand galvanically by switching of its switching units to those busbars to which the appliance is connected. The selected strands or the at least one selected strand is thus switched to a busbar pair to which the appliance is also connected.

Although the invention is described here for a single appliance connected to a busbar pair, of course at least one further appliance may also be connected to a further busbar pair and then at least one strand for each further appliance may also be selected and connected by means of the suitability criterion for an energy exchange. In order to connect a strand end in variable manner to different busbars of the busbar assembly, each switching unit may comprise multiple contactors, for example, and each contactor may be provided for the connecting of the strand end to a busbar. The switching unit may also be a contactor of changeover switch type (1-to-N multiplexer), which can switch between the different busbars. Of course, each switching unit may also decouple a strand end galvanically from all busbars.

The invention affords the benefit that usage units can be connected alternately to different appliances with little circuitry expense.

The invention also includes modifications which afford additional benefits.

The energy supply device may be based on different technologies for the providing of electrical energy. Each usage unit may comprise at least one battery cell, especially a battery cell module or an assembly of multiple battery cell modules (hooked up in parallel, for example). In addition or alternatively to this, a usage unit may comprise at least one fuel cell and/or at least one solar panel and/or at least one capacitor and/or one generator. Preferably, it is provided that each time only usage units of the same technology are provided in each strand, for example only battery cell modules. But strands of different technology may be provided, e.g., in order to provide a predetermined power profile and/or current profile that could not be produced with only a single technology.

Said suitability criterion by which at least one strand is selected for the energy exchange with the appliance may dictate a charge state and/or a performance capability of the usage units of the respective strand in relation to the current energy exchange process. By performance capability is meant in particular a maximum achievable electrical power and/or one which is achievable over a predetermined length of time. It may be dependent on the current state of wear of the usage units of the strand.

But it may also be provided at first to specifically configure a strand such that it can be used for an energy exchange, i.e., to reconfigure the strand so that it fulfills the suitability criterion. For this, one modification proposes that a bridging circuit is provided within each strand for each usage unit. Hence, in each strand at least one usage unit can be electrically bridged over by means of its bridging circuit, so that it is not involved in the energy exchange process and thus does not need to provide any electrical power. In this way, the influence of a worn or undercharged usage unit can be excluded and the strand with the rest of the usage units can then fulfill the suitability criterion, for example, and be used for the energy exchange. Said control device is adapted to control the respective DC voltage converter of each strand and the at least one switching unit of each strand and the bridging circuits of the usage units in order to control the energy exchange.

The series circuit of the usage units of a strand generates a strand voltage, which can be set within predetermined limits by means of the DC voltage converter. If an appliance requires an electrical voltage which is larger than the largest strand voltage, in theory this appliance cannot be supplied by the energy supply device. On the other hand, a charging voltage which is larger than the series circuit of the usage units can accept cannot be used for the charging of usage units. In order to nevertheless handle such an electrical voltage, one modification proposes that a further switching unit is provided for every two strands, which is adapted to connect the two strands in series for the energy exchange. The strand voltages through the series-connected strands are then added together. The control device of the energy supply device is adapted to galvanically connect the series-switched strands to that busbar pair leading to the at least one appliance which is generating or requires the voltage. The appliance may thus be an energy source for the charging of usage units.

As already mentioned, multiple appliances may also be connected to different busbars of the busbar assembly for the energy exchange. The control device is then preferably adapted to maintain the appliances galvanically separated from each other by switching the switching units of the strands. In this way, for example, it is possible to observe a legal requirement for galvanic separation of electrical appliances on an energy supply device. For example, if the energy supply device is designed as a charging column for electrical vehicles, multiple vehicles can be connected to the energy supply device without this producing a galvanic connection between the motor vehicles.

As already mentioned, the usage units within each strand are chosen such that each time usage units of the same technology are provided in a strand, i.e., for example only battery cell modules of a particular performance class (power modules or storage modules). But the energy supply device may also provide a mix of different technologies. For this, the technologies of at least two of the strands will be different. The different technologies are chosen on the whole such as to produce a given current profile and/or power profile by the energy exchange. In other words, a different contribution is produced by the strands during the energy exchange. This produces a current profile and/or power profile, i.e., for example, a predetermined variation over time for a rapid charging of a motor vehicle. In a first time segment of an energy exchange process, the contribution of one strand may then be greater than the contribution of another strand, while this may be reversed in a second time segment of the energy exchange process, so that the other strand provides a greater contribution. Thus, for example, the first strand may provide a larger power than the other strand, while the other strand may provide a larger continuous current than the first strand.

In order to connect the energy supply device to an alternating current source, the energy supply device may comprise an AC/DC converter assembly connected to the busbar assembly for the exchanging of electrical energy with a public electrical supply grid or with an AC energy source (AC=alternating current). One example of an AC energy source is a grid-autonomous energy source, such as an emergency generator or a wind turbine. The control device of the energy supply device is then adapted during the energy exchange with an appliance, when at least one of the strands is, to charge at least one other of the strands across the AC/DC converter assembly with the electrical energy from the supply grid or from the AC energy source. Thus, in this way a simultaneous charging and discharging of different strands is possible.

Preferably, a capacitor device is provided at an output terminal which is adapted for the connecting of the appliance. In this way, power peaks at the output terminal can be compensated. In addition or alternatively, a capacitor device may also be provided at an input terminal across which the AC/DC converter assembly can be connected to an electrical supply grid or another AC energy source.

The method according to the invention results from the operation of the energy supply device according to the invention. The method starts from the energy supply device having the plurality of usage units, wherein each usage unit is designed to generate or to buffer electrical energy. A control device controls the energy exchange between the energy supply device and an appliance coupled to the energy supply device. The energy supply device carries out the energy exchange through the busbar assembly, having busbars which form said busbar matrix, i.e., affording a possibility of forming different busbar pairs by providing more than one busbar for each polarity (plus or minus). In the energy supply device the usage units are divided up into strands and in each strand the usage units are hooked up in a series circuit. The series circuit is connected across a DC voltage converter to one strand end of the strand and each strand end of the strand is connected in turn across a galvanically separable switching unit to the busbar assembly. The control device selects at least one of the strands by a predetermined suitability criterion for the energy exchange and connects each selected strand galvanically by switching of its switching units to those busbars leading to the appliance, i.e., to which the appliance is connected.

The invention also includes modifications of the method according to the invention having features such as are already specified in connection with the energy supply device according to the invention. For this reason, the corresponding modifications of the method according to the invention are not again described here.

The exemplary embodiments explained in the following involve preferred embodiments of the invention. In the exemplary embodiments, the components of the embodiments which are described constitute individual features of the invention, to be viewed independently of each other, which also modify the invention independently of each other and thus are also to be regarded as part of the invention individually or in a different combination than the one shown. Furthermore, the embodiments described may also be amplified by other features of the invention which have already been described.

BRIEF DESCRIPTION OF THE FIGURES

In the Figures, functionally identical elements are each time given the same reference numbers.

DETAILED DESCRIPTION

In the figures, functionally identical elements are each time given the same reference numbers.

Figure 1:
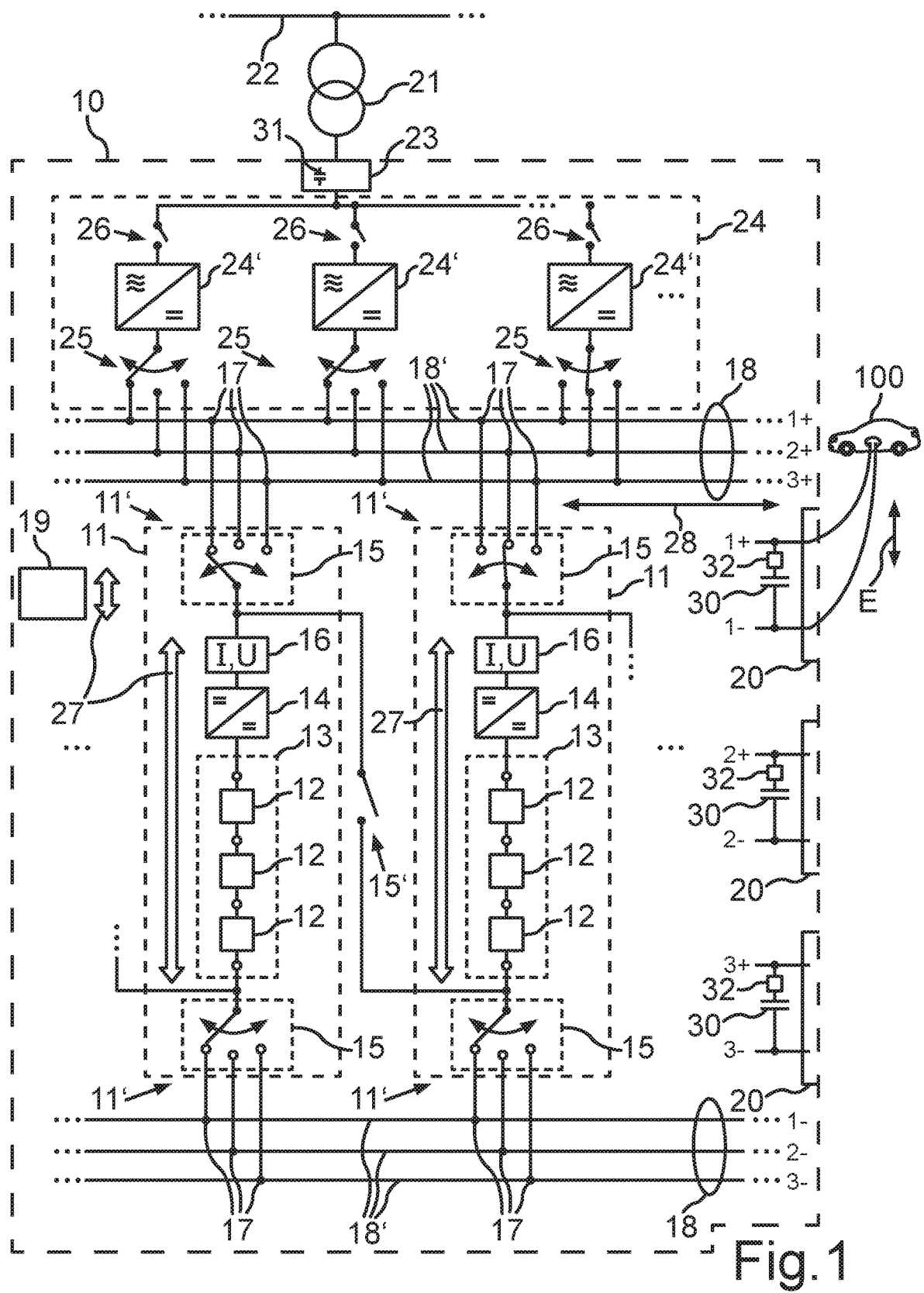
FIG. 1 shows an electrical energy supply device.

FIG. 1 shows an electrical energy supply device 10, which may be designed as an energy storage or as a pure energy source or as a combination thereof. The energy supply device 10 may, e.g., be provided as a stationary storage for electrical energy. It may be constructed, e.g., on a road network. At least one appliance 100, such as an electrically powered motor vehicle, may be connected to the energy supply device 10, in order to charge, e.g., a traction battery of the motor vehicle by means of an energy exchange E. The energy supply device 10 may also be provided for use as a mobile battery or a traction battery or a solar storage. As the traction battery, for example an electrical machine of a traction drive can be connected to the energy supply device. The energy supply device 10 in the charged state can put out at least 1 kW of electrical power and/or deliver at least 1 kWh of electrical energy.

In the energy supply device 10, multiple circuit pathways or strings or strands 11 may be provided for the energy exchange E, and in each strand 11 multiple usage units 12 may be hooked up to form a series circuit 13. The usage units 12 are thus brought together in the energy supply device 10, i.e., in a vehicle traction battery or in a stationary electrical storage, for example. The energy supply device 10 may comprise a housing in which the strands 11 and the busbar assembly 18 are arranged.

Each usage unit 12 may contain respectively an electrical energy storage and/or a pure source for electrical energy. As the energy storage, a usage unit may contain, e.g., an electrochemical battery cell or a battery cell module with multiple battery cells or a capacitor or a capacitor assembly having multiple capacitors. Examples of battery cells are those with lithium ion, lead, and solid state technology. Examples of suitable capacitors are dual-layer capacitors (so-called supercaps (R)) with a capacity of preferably at least 1 mF, especially at least 100 mF). Examples of a pure source are a fuel cell and a solar cell. As the energy source, a usage unit 12 may contain, e.g., a fuel cell or a fuel cell stack or a solar cell or a solar panel or a generator, e.g., of a power station (such as a pumped storage power station). A usage unit 12 may also comprise a parallel circuit of multiple battery cells or battery cell modules, for example, in order to boost the current.

Within each strand 11, the technology used for the usage units 12 is the same, i.e., for example, only battery modules or only solar cells are provided. Thus, each strand 11 comprises usage units 12 of the same technology, for example, each one has a lithium ion accumulator as the battery cell module. But mixed technologies may also be provided by different strands 11. In this way, the energy supply device may be adapted to a purpose of use or to a required operating profile. For example, two strands of different technology may be provided for the use of the energy supply device 10 in the motor vehicle as a traction battery, e.g., with a dividing up of the number of usage units 12: 80% energy cells (large storage capacity), 20% power cells (more costly, but greater power flow).

Each strand 11 may further have, as shown in FIG. 1, in addition to the series circuit 13 of usage units 12: a DC voltage converter 14, a respective mechanical switching unit 15 at the strand ends 11', a measuring device 16 for a strand current strength I and/or a voltage measuring device to detect a summed voltage or a strand voltage U of the strand 11.

Each DC voltage converter 14 may be designed in known manner. In general, the DC voltage converter may be a boost converter or a buck converter or a buck-boost converter. In particular, each DC voltage converter 14 may be a buck converter. Each switching unit 15 may have a mechanically switching design and in particular be capable of galvanic separation. Each switching unit 15 may have multiple ON/OFF contactors or (as shown in FIG. 1) a contactor designed as a changeover switch (1-to-N multiplexer). By means of each switching unit 15, the respective strand end 11' can be alternately connected to and separated galvanically from strand terminals 17. Each strand terminal 17 constitutes an electrical connection to a busbar 18'. The busbars 18' as a whole form a busbar assembly 18 of independent busbars 18'. Each strand terminal 17 of a strand 11 may be connected to another busbar 18' of the busbar assembly 18. Thus, multiple strand terminals 17 may be provided for each strand end 11' (plus pole and minus pole), in order to alternately connect the strand 11 to multiple different busbars 18' of the busbar assembly 18 or separate it from each busbar 18' galvanically. Thus, by opening the two switching units 15 of a strand 11, the strand can be galvanically decoupled and also be replaced during the ongoing operation of the energy supply device 10.

Each strand 11 can provide by means of the series circuit 13 a summed voltage or DC voltage U at the strand terminals 17. The DC voltage U may be a DC voltage (HV) which can amount to more than 60 V, especially more than 100 V. But it may also be provided that the DC voltage U lies in the range of 8 V to 60 V. Thus, between two busbars 18' there is present a DC voltage if a strand 11 is galvanically connected to them. For this, each strand 11 may be galvanically connected alternately by means of its switching units 15 to a respective pair of busbars 18. The strand 11 may be alternately switched galvanically by means of the switching units 15 to a respective busbar pair by connecting each time a stand end 11' to a busbar 18' of the busbar pair, so that the DC voltage U drops across the busbar pair.

The measuring unit 16 may also provide the mentioned total voltage measurement across the string 11, in order to detect the DC voltage U. For this, the measuring unit 16 is preferably connected downstream from the DC voltage converter 14, as shown in FIG. 1, in order to make possible a voltage regulation by means of the DC voltage converter 14. As shall be further explained in connection with FIG. 2, an individual voltage measurement is also provided in each usage unit 12.

The at least one appliance 100 can be connected across the busbar assembly 18 to the strands 11. Thus, a busbar matrix is formed by the busbars 18' of the busbar assembly 18, by which optionally at least one selected strand 11 can be electrically connected to a selected appliance 100, while at the same time another appliance can be electrically connected to at least one other strand 11. The appliances are galvanically separated from each other in this case.

Which strand 11 is electrically connected to which busbar 18' can be determined by a control device 19. For this, the control device 19 can ascertain a respective energy demand and/or a respective power demand of the at least one connected appliance 100 and then select at least one strand 11 by means of which the demand can be met. The demand can be communicated by the appliance 100 itself, e.g., via a communication interface, or it may be stored e.g. as a fixed value in the control device 19. The control device 19 can then connect the switching units 15 of each selected strand 11 to the busbars 18' leading to the connected appliance 100.

Each time a further switching unit 15' can be provided between every two strands 11 in order to hook up two strands 11 in series and thus add their strand voltages together. In this way, a larger voltage can also be provided between two busbars 18' than can be generated by a single strand 11.

The busbars 18' can be respectively connected in pairs to an output terminal 20, to which a respective appliance 100 can be connected. The connections of the busbars 18' to the individual electrical contacts of the output terminals 20 are indicated in FIG. 1 by corresponding lettering 1+, 2+, 3+, 1−, 2−, 3−, where "+" can stand for plus potential and "−" for minus potential or ground potential. The lettering symbolizes three possible busbar pairs: 1+, 1− and 2+, 2− and 3+, 3−, while another switching device, not shown, can also connect the electrical contacts of the output terminals 20 alternately to different busbars 18'. The output terminals 20 in this process can constantly remain galvanically separated from each other, as long as each busbar 18' of a terminal 20 is galvanically connected to another strand 11.

A simultaneous charging and discharging of different strands 11 may also be provided here, e.g., in order to supply an appliance 100 successively with electrical energy from different strands 11, which are recharged in the meantime. For example, a charging process of a busbar pair can occur with an output voltage of 400 V, for example, while at the same time a charging of other strands 11 may occur, e.g., via a transformer 21 with a charging voltage of 800 V, e.g., from a supply grid 22 or from another energy source external to the device. The transformer 21 can be connected to an input terminal 23 of the energy supply device 10. If the strands 11 are not designed for this charging voltage, they can be hooked up in series by means of the switching unit 15' to form a series circuit. The galvanic separation occurs through the use of different busbars 18' for the respective strands 11 and/or each voltage level (output voltage and charging voltage, e.g., 400 V and 800 V).

The strands 11 can also bring about a power concentration, in that an energy source, such as a solar layout, with a first power feeds energy to at least one strand 11 at the input terminal 23 and then the strand 11 surrenders this energy once more with a second power, which is greater than the first power, to an appliance 100 connected to an output terminal 20.

As a stationary storage, the energy supply device 10 may optionally comprise a modular-design AC/DC converter assembly 24 for the input terminal 23, having multiple AC/DC converters 24', which can be individually switched between the busbars 18' by means of a switching unit 25 in order to provide a predetermined current strength and/or charging voltage for a charging current on a busbar 18' or also to galvanically separate the respective AC/DC converters 24' from the busbar assembly 18. A galvanic separation from the input terminal 23 is also possible by means of further switching units 26. The switching units 25, 26 may be formed each time by a contactor. The switching units 25, 26 can be controlled by the switching device 19. Thus, by opening the two switching units 25, 26 of an AC/DC converter 24', this converter can be galvanically decoupled and also replaced during the ongoing operation of the energy supply device 10. The switching units 25, 26 thus constitute decoupling switches. The AC/DC converters 24' may be galvanically separating types. But the AC/DC converter assembly 24 need not have galvanically separating AC/DC converters 24'. Other converters are more favorable. The galvanic separation can be provided at any time by means of the mechanical switches of the strands.

A grid-autonomous energy source, such as an emergency generator or a wind turbine, may be connected to the input terminal 23 in place of the supply grid 22. On the other hand, the energy supply device 10 itself may provide a grid, i.e., it may dictate a grid frequency for other appliances connected to the input terminal. This is especially advantageous for the use of the energy supply device 10 in a region without its own supply grid 22. It is possible to operate AC appliances without adaptation, as in a public supply grid. The reverse of a grid-forming operation is a grid-following operation, i.e., an operation synchronized to a given grid frequency.

For the switching of the switching units 15, 15', 25, 26 and the usage units 12 and for the receiving of data from the usage units 12, the control device 19 may be coupled to these components via a communication device 27. The communication device 27 may comprise, e.g., a communication bus, such as a CAN (CAN—Controller Area Network) bus, or an Ethernet.

The control device 19 thus accumulates general knowledge as to what can be switched in which manner, i.e., which busbar 18' can be hooked up to which strand 11. The control device 19 may be designed at least partly as a central control device for all strands 11 and/or at least partly as a distributed control device for each strand 11. It may comprise a processor device with at least one microcontroller and/or at least one microprocessor. An operating program of the processor device may be adapted to carry out the described method steps for the operation of the energy supply device 10 when executed by the processor device.

Optionally, capacitors 30, 31 (especially dual-layer capacitors) may be provided at the output terminals 20 and/or at the input terminal 23 in order to buffer load peaks. In this way, when load peaks occur (in the range of up to 3 s or 5 s, for example), the usage units 12 can be operated more gently, since the load peak is damped. A load peak may be an electrical power greater than the sum of the individual power ratings of the connected usage units 12, especially a power greater than 1.2 times the sum.

For a changeover operation at the busbars 18', a recharging circuit or limiting circuit 32 (switch and resistor element) may be hooked up in series with the respective capacitor 30, 31 in order to conduct a capacitor current through the resistor element, thereby limiting the current strength of the capacitor current to a predetermined maximum value. The limiting circuit 32 can be used for the charging and discharging of the respective capacitor 30, 31. A capacitor 30, 31 with its limiting circuit 32 constitutes a capacitor device. The limiting circuit 32 thus constitutes a precharge circuit.

A cooling of the strands 11 (especially the usage units 12 in the strands 11) for example in a rack can be provided by arranging a cooling level beneath the strand level.

Each busbar 18' may be made of aluminum or copper. Aluminum is a more economical material and is lighter than copper. Aluminum due to its resistivity generates a loss power (and moreso than copper), from which heating power can be generated for a temperature control of the usage units 12 (especially battery cells), which can be transferred by a thermal coupling, e.g., a cooling circuit, from the busbars 18' to the usage units 12.

When the current is divided up among multiple strands 11 on one busbar 18', the current strength I can be adapted, e.g., equalized or dynamically adjusted, by setting or regulating the individual strand currents I via the DC voltage converter 14 of the strand 11. Thus, for example, the required total current strength for the appliance 100 can be apportioned among N strands 11, e.g., N=3, and each strand 11 can generate its own current strength I setting, e.g., with N=3: 50%, 25%, 25%.

In this way, the available technology of the usage units 12 in the respective strand 11 can be taken into account, so that the usage units 12 are operated within their specification. Since the electrical voltages U can be determined, the DC voltage converter 14 can then be used to set the current I, so that equalization currents will flow between the strands 11, for example, which are smaller than a threshold value. Thus, e.g., it can be assured that, in the case of batteries, a current I of up to 300-400 A per battery cell will flow for only 15 s, but a continuous current will flow only up to 150 A. Thus, each strand 11 may be operated with its own operating strategy, adapted to its technology. A suitable current strength I can be set by means of the DC voltage converter 14.

In addition or alternatively, in dependence on the line length 28 of the busbar sections leading from a strand 11 to an output terminal 20 (i.e., to a consumer), the current strength I of the respective strand 11 can be adjusted by means of its DC voltage converter 14 through the control device 19 in order to set the apportionment of the current strengths I in the case of multiple parallel-switched strands 11 in dependence on the line length 28 and in dependence on the consequently resulting losses, in order to optimize the losses (e.g., minimize them, or maximize them for heating) and/or to apportion them physically. A strand 11 with shorter line length 28 of the feed line across the busbars 18' can be allocated a greater current strength I for the minimization than a strand 11 with longer line length 28. Hence, the effect of different line lengths is compensated. The current strength I may also be set in dependence on a current temperature of the line sections. Thanks to such a power management, the drawback of the higher resistivity of aluminum can be compensated by dictating and adapting the current strength to individual line sections.

Thus, summarizing, when so needed the control device 19 can hook up the strands 11 with the currently required aptitude to the particular busbars 18 leading to the output terminal 20 at which the power will be picked off by a connected appliance 100. Each strand 11 can be decoupled as needed by means of its switching units 15. Each strand 11 may be individually drained or loaded. In addition or alternatively, an efficiency optimization for the DC voltage converter 14 within the strand 11 can be carried out by setting its input voltage through the selecting and hooking up of usage units 12. The DC voltage converter 14 of each strand 11 can thus perform two duties. It limits the strand current I to a predetermined target value so that usage units 12 can be operated according to their predetermined specification (operating limits). The voltage U of the strand 11 can be equalized to the busbar voltage. In this way, the equalizing currents between multiple strands 11 can be reduced. In addition, the DC voltage converter 14 ensures that a predetermined nominal voltage is present at the strand terminals 17, regardless of the number of usage units 12 actively being operated in the strand 11.

A current metering 16 for the strand current I can be done centrally in the described manner in the measuring unit 16 in the strand 11 and this is necessary any way for the regulating of the DC voltage converter 14.

The central control device may also reconfigure the strand individually within each strand 11, i.e., turn usage units 12 on and off in the series circuit 13 of the strand 11. For example, if the strand voltage U is less than a required busbar voltage of the connected busbars 18', more usage units 12 can be switched on in the series circuit 13 of the strand 11. This may be done by means of semiconductor switches (e.g., transistors) so quickly that it may occur during a switch pause of the DC voltage converter 14.

Figure 2:
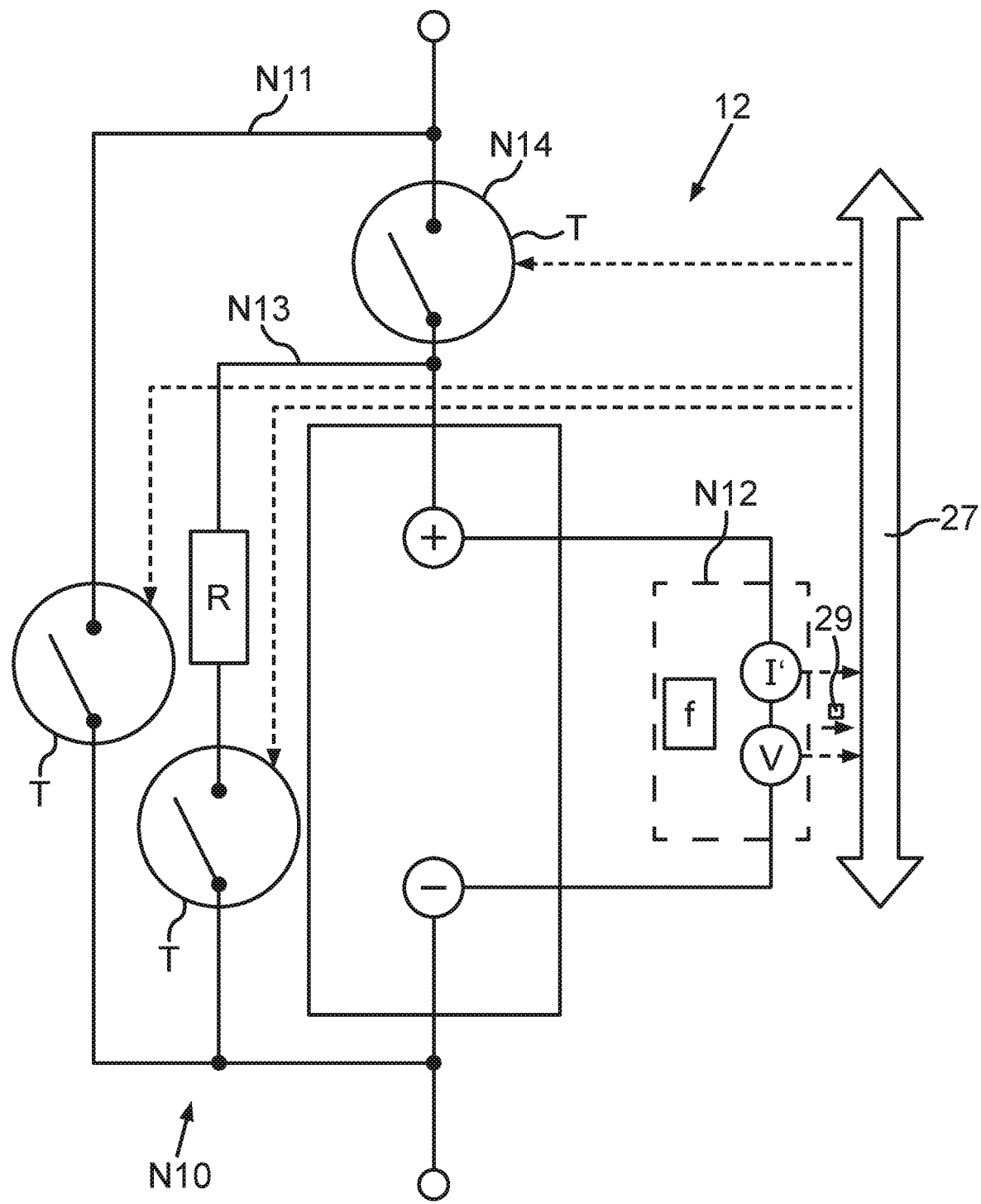
FIG. 2 shows a usage unit that can be electrically bridged over, electrically isolated, and/or discharged by an individual switching device.

For this, FIG. 2 shows how each usage unit 12 can be electrically bridged over, electrically isolated, and/or discharged by an individual switching device N10. For this, semiconductor switches T (transistors) are provided as mentioned. Each usage unit 12 may provide as functions: a bridging/a bridging circuit N11, a diagnostic unit N12, a (especially passive) load balancing/a discharging circuit N13, a decoupling/separation circuit N14. A semiconductor switch T need only be able to block a low voltage, e.g., 2× the individual voltage V of the usage unit 12. The load balancing may also be done actively in known manner (so-called active load balancing). In addition to the switch for the separation circuit N14, another switch may also be provided for the second, opposite pole (all-pole switching). The diagnostic unit N12 may be adapted in known manner for a cell analysis, e.g., an impedance metering by means of impedance spectroscopy, for example. For this, the diagnostic unit N12 can determine for each usage unit 12 for the impedance spectral analysis (0 Hz to 3 kHz, for example) a measurement current I' and an individual voltage V in the case of multiple frequencies f, resulting in the impedance as a function of the frequency f. This represents an impedance spectrum. The diagnostic unit N12 may report a current state value 29 of a measurement current I' and/or the individual voltage V and/or the measured impedance via the communication device 27 to the control device 19. By the term "impedance" is meant in the context of the invention an impedance value at a predetermined frequency, such as 0 Hz, or an impedance variation as a function of the frequency f. Multiple frequencies can be checked in a frequency sweep with a stepwise incrementing or decrementing. Alternatively, a multifrequency excitation can be provided at the same time in the case of multiple frequencies. The multifrequency excitation may be designed, e.g., as a multi sine excitation or as a square wave or as a step signal.

Each usage unit 12 can be individually monitored, for example in regard to its SoH (State of Health—state of wear) and/or SoC (State of Charge—energy supply capacity) and/or SoF (State of Function—performance capability). The parameters SoH and SoC and SoF are known in the prior art.

Independently of the impedance measurement, the individual voltage V of the usage unit 12 can also be measured without the alternating voltage of the impedance measurement. A usage unit 12 which is bridged over (by means of the bridging circuit N11) can also be monitored in regard to its individual voltage V. Before being turned on (N14 making the circuit or making electrically conductive), the individual voltage V of the usage unit 12 can be individually adapted by means of the load balancing N13. Optionally, an electrical charging unit may also be provided for each usage unit 12, which can individually charge the usage unit 12 even when the semiconductor switch of the separation circuit N14 is open (each usage unit 12 may thus be charged individually). The energy supply for the charging unit may come, e.g., via the communication device 27 (e.g., by means of Power-over-Ethernet technology) or by means of a galvanically separated power supply unit.

An interlocking of N11 and N14 can be provided (e.g., by software or by logic circuit), so that no short circuiting is produced.

In addition, a temperature measurement by the diagnostic unit N12 or by the control device 19 can provide feedback as to the temperature from the impedance.

Hence, the control device 19 has access to each individual usage unit 12 via the communication device 27. The state of each usage unit 12 can be read out and the switching device N10 of each usage unit 12 can be controlled, in particular the bridging circuit N11 in combination with the separation circuit N14. By combined switching of the bridging circuit N11 and the separation circuit N14, a usage unit 12 in the series circuit can be alternately switched on and off.

On this basis, the wear/condition of each usage unit 12 can be determined centrally in the control device 19 (e.g., in the form of the impedance as a wear value) and the switching state of each usage unit 12 can be adjusted in dependence on the condition so determined. Individual usage units 12 can be electrically removed from the string 11 (bridging N11), inserted (hooked up in series), individually discharged (discharging resistor R, balancing circuit N13), or temporarily electrically separated (N14 opening the circuit/electrically blocking), e.g., for the diagnostic unit N12.

Hence, it is possible to respond to different wear/individual parameter variance of the usage units 12 in the strand 11: preferably only usage units 12 with similar parameter values will be operated actively. The similarity can be defined by a similarity criterion, which indicates e.g. a maximum difference of at least one parameter, the difference lying in the range of 10% to 100% (twice/half). An old/weak usage unit 12 will at first be bridged or disconnected. This can be recognized by a performance capability criterion, which is related to the impedance, for example, or defined in that the similarity criterion is violated. The performance capability criterion thus excludes usage units 12 which are too weak. The switching in of old usage units 12 or weak usage units 12 becomes possible afterwards once the strand conditions are suitable, that is, the other usage units 12 are likewise worn down so much that the similarity criterion is once more fulfilled.

Thanks to the similarity criterion, the need for a load balancing can be reduced. The power per usage unit (current I in the strand is the same, but a different power results for different voltage, resulting in a local heating and thus aging or wear) can be equalized in advance. This is because load balancing requires an equalizing to the "weakest" usage unit, i.e., the one which is generating the lowest voltage, i.e., it must be reduced to the lowest voltage. Thanks to creating identical or similar operating conditions in advance by means of the similarity criterion, less balancing is needed. Thus, for example, if the individual voltages of V=4.1 Volt and V=3.9 Volt are present in a strand, a balancing would have to adjust to the weakest usage unit, i.e., to 3.9 Volt. With the internal resistance measurement (impedance spectroscopy), the weakest usage unit (greatest internal resistance) can be identified (performance capability criterion) and disconnected from the strand 11 (bridging N11). But the impedance is only one example of the identifying of a weak usage unit. In general, the identifying of the weakest usage unit can be done in dependence on a state of the usage unit.

By electrical decoupling/separating N14 of all usage units 12 of a strand 11, the strand 11 can also be switched HV-free. All usage units 12 are decoupled from each other. In this safeguarding mode, the strand 11 can be secured, e.g., for an installing, an accident protection, an emergency, or a transport. The switching sequence is important. First the mechanical switching units 15 (contactors) are opened, then the usage units 12 are decoupled N14 in series.

The control device 19 can also provide a wear equalizing or wear leveling of the individual usage units 12. Wear leveling provides a homogeneous usage of the field or arrangement of usage units 12. In this way, wear is equalized during the operation of the usage units 12. An example is the wear leveling from flash memory technology (https://en.wikipedia.org/wiki/Wear_leveling).

The benefit from equalizing the wear is a lengthening of the overall lifetime of the energy supply device 10, since it reduces the probability of malfunction of individual usage units 12, such as may be caused by excessive wearing of an individual usage unit 12.

The supplying/removal of energy, i.e., the energy exchange E with a connected appliance 100, occurs by means of the nearest usage units 12 according to wear leveling. For this, a current wear state is indicated for each usage unit 12 as a wear value. The purpose of this procedure is thus a uniform wear. The wear value may be represented, e.g., by the impedance of the usage unit 12. The wear value indicates a deterioration of the usage unit 12.

For each usage unit 12, depending on the wear value, it is possible to determine a respective target value of at least one operating quantity, such as the current I during the discharging and/or the individual voltage V during the charging, on the basis of an equalization criterion, where the equalization criterion ensures that, by adjusting each target value, one or more or all of the usage units 12 will perform the energy exchange E completely, yet the difference in deterioration of the usage units 12 as calculated from all wear values is kept to a minimum. Thus, the deterioration of the usage units 12 is equalized during the energy exchange E in that more heavily worn down usage units 12 are loaded less than less worn down usage units 12. The latter become further deteriorated, so that their state of deterioration approaches that of the less loaded usage units 12.

The wear value will change during operation, and this will occur more quickly if the usage unit 12 is operated at an operating point which departs from an ideal state (the usage unit is further worn down). Therefore, protective measures are also advisable.

Preferably for this, the usage units 12 are only operated in a tolerance range about an ideal charging state, which might be for example a charging state of 50%, and/or which may specify a current profile of an electrical current of the usage unit 12 that is flowing during the energy exchange.

In general, the ideal state is dependent on the technology used for the usage unit and is known in the prior art. The ideal state for battery modules can be defined by the following parameters:

SoC—State of Charge (energy content)—ideally 50%, for example;

DoD—Depth of Discharge—degree of discharge (current profile) e.g., ideal state of charge 50% minus maximum of 20% (tolerance range).

The indicated ideal values are dependent on the electrochemistry and/or the designated use and are to be determined each time by the skilled person for the specific energy supply device.

In general, the DoD should remain "low", i.e., not drop too much.

The further the current operating point is away from the ideal state, the quicker the wear value rises. The current operating point can be adjusted by adjusting the charging current/discharging current I for the usage units 12 accordingly. The AC/DC converter assembly 24 can be used to adjust the charging current, and the DC voltage converter 14 to adjust the discharging current. The wear states/wear values of all the usage units should be equalized in this way.

Another protective measure is the following: an overcapacity can be kept on hand at the usage units 12. Without additional switches, the load can be distributed by means of an overcapacity at usage units 12. There will be less loading per usage unit 12 if all usage units are always used at the same time in order to achieve uniform wear. But also the lifetime is increased because of the lower loading; for example, if only 100% (nominal rated value) is called up at 110% capacity per strand (sum of the individual capacities of the usage units 12 in the strand) with throttling by the control device 19, resulting in a lower peak loading per usage unit 12. The strand 11 for example delivers a larger voltage than is required, and therefore less current I needs to flow for the same power as when only 100% of the rated value (rated capacity) is occupied. For example: 12 usage units are provided, but a rated value of only 10 usage units is made available.

Without switches, 12 usage units need to be switched in, but the capacity for only 10 usage units is called up electronically (no switching needed!). In this way, weaker usage units are also possible, since their peak currents are lower, on account of the resulting higher strand voltage U, since more usage units are hooked up in series than are nominally present. The use of cheaper usage units is possible.

If switches are available, e.g., the semiconductor switches T, an exchanging can be provided among the usage units 12 of a strand 11, e.g., 10 usage units are always provided (producing the rated capacity) and 2 usage units are bridged over.

The providing of an overcapacity at usage units 12 means that the sum of the individual rated capacities of the usage units 12 (i.e., their combined gross capacity) is greater than the rated capacity made available to the outside. In this way, a fault in a usage unit can also be compensated. Thus, the energy supply device 10 can be provided, e.g., as an energy storage (such as a battery accumulator) with a designated or nominal rated capacity (such as 100 kWh). In actuality, a gross capacity is provided internally which is greater than the rated capacity made available on the outside (actual gross capacity of 110 kWh, for example, greater than the rated capacity of 100 kWh, for example). In other words, more usage units (e.g., battery cell modules) are present than are needed for providing the rated capacity.

Only as many usage units are made available to the outside for the discharging as correspond to the rated capacity. These usage units are then "active units". The other storage units (not actively used) are "reserve units".

According to a bad-block management (BBM), defective or depleted active units are recognized and taken out of operation. That is, upon malfunction/defect of an active unit (defective usage unit), this malfunctioning active unit can be taken out of operation and a reserve unit (a thus far inactive usage unit) can be placed in operation as a new active unit. Thus, the rated capacity is preserved despite the outage of one or more usage units. The term bad-block management (BBM) comes from flash memory technology (https://en.wikipedia.org/wiki/Flash_memory#Memory_wear).

In normal operation, however, a rotating or exchanging of the usage units may be done (e.g., by the round-robin algorithm or in general by a predetermined exchange protocol), so as to achieve uniform wear for all the usage units. If a reserve unit is then activated as a replacement for a malfunctioning active unit, the reserve unit will already have similar electrical properties to the other active units, because it already has a similar degree of wear (in the sense of the mentioned similarity criterion). This may reduce the extent of the necessary load balancing in the described manner.

Thanks to the dividing up of usage units into active units and reserve units, usage units may also be replaced during a maintenance during the operation of the energy storage, without affecting the rated capacity. The usage units being replaced can be separated as reserve units or taken out of operation and then be removed or replaced (dynamic changing of the usage units).

The bad-block management and/or the exchanging can also be done by groups or by strands, i.e., a group of usage units 12 or the entire series circuit 13 of a strand will then be hooked up and/or replaced. A bad-block management can also be done within a usage unit 12. Thus, for example, in the case of a usage unit 12 designed as a battery module, multiple battery cells can be provided, e.g., 12 battery cells as a 3-fold series circuit of 4 battery cells each in a parallel assembly. Then each time a parallel assembly can be switched out, e.g., by bridging.

The following can be provided in regard to a charge management for the strands.

Energy can be transferred across the busbars 18 by means of the DC voltage converter 14. Thus, a strand 11 can be charged via multiple sources, e.g., 40 kW from another strand 11 and 10 kW from a grid AC/DC converter 24', in order to provide 50 kW of charging power.

When supplying power, a load profile can be smoothed out or equalized in that several strands 11 will supply the consumer, while other strands 11 are already charging and will stand ready for the further charging process. For example, charging with 10 A and discharging with 20 A can be done at the same time (at least one strand 11 charges the appliance 100, at least one other strand 11 is charged from the supply grid 22). A boost current (transient peak, e.g., by more than a factor of 1.5) can also be generated by switching in a strand 11.

The (thermal/electrical) loading of the individual strands 11 can be limited by different strands 11 alternately supplying a connected appliance 100 (e.g., charging an electric vehicle). Thus, the mentioned DoD (Depth of Discharge) can also be limited, e.g., to 20%.

A complete galvanic separation between the strands can also be achieved by means of the mechanical switching units 15 at each strand 11, if they are switched to different busbars. This is the precondition for charging multiple appliances 100 (such as e-vehicles) at the same time. Each e-vehicle is connected to a different busbar 18' which is galvanically separated from the other busbars.

On the whole, the examples show how an energy supply device with a busbar matrix for the variable connecting of strands can be provided by the invention.

The invention claimed is:

1. An electrical energy supply device comprising:
a plurality of usage units, wherein each usage unit is designed to generate, buffer, and/or dynamically redistribute electrical energy, a control device designed to control an energy exchange between the energy supply device and an appliance connected to the energy supply device, a busbar assembly through which the energy supply device carries out the energy exchange, the busbar assembly comprising a busbar matrix comprising a first plurality of busbars for each positive potential, the first plurality of busbars comprising at least three busbars with three different positive potentials, and a second plurality of busbars for each negative potential, the second plurality of busbars comprising at least three busbars with three different negative potentials,
wherein the usage units are divided up into a plurality of strands, wherein each strand comprises a positive potential end, a negative potential end, and a series circuit of usage units connected to one of the positive and negative potential ends across a respective DC voltage converter,
wherein each strand is connected across a switching unit to the busbar assembly, the switching unit comprising a 1-to-N multiplexer which selects between pairs of the plurality of busbars to connect and disconnect the positive and negative potential ends to a selected busbar pair,
wherein the control device is designed to select at least one of the strands by a predetermined suitability criterion for the energy exchange and to connect each selected strand galvanically by switching of the switching units to those busbars from the second plurality of busbars to which the appliance is connected, and
wherein adjacent strands are selectively connectable in series,
wherein the energy supply device further comprises a bidirectional AC/DC converter assembly connected to the busbar assembly for exchanging electrical energy with at least one of a supply grid and an AC energy source, and
wherein the control device is further configured to control, while at least one of the strands is discharged during the energy exchange, charging of at least one other of the strands across the bidirectional AC/DC converter assembly with the electrical energy from the supply grid or from the AC energy source.

2. The energy supply device according to claim 1, wherein each usage unit respectively comprises at least one of: one or more battery cells, at least one fuel cell, at least one solar panel, at least one capacitor, and a generator.

3. The energy supply device according to claim 1, wherein the predetermined suitability criterion is used to dictate a charge state and/or a performance capability of the usage units of the respective strand in relation to a process of the energy exchange.

4. The energy supply device according to claim 1, wherein a bridging circuit is provided within each strand for each usage unit and the control device is designed to control the respective DC voltage converter of each strand and the at least one switching unit of each strand and the bridging circuits of each usage unit in order to control the energy exchange.

5. The energy supply device according to claim 1, wherein, when multiple appliances are connected to different busbars of the busbar assembly, the control device is configured to maintain the appliances galvanically separated from each other for the energy exchange by switching the switching units of the strands.

6. The energy supply device according to claim 1, wherein a first of the plurality of strands comprises at least two usage units each comprising a first technology and a second of the plurality of strands comprises one or more usage units of a second technology which differs from the first technology, and
wherein at least the first and second of the plurality of strands produce a current profile and/or power profile dictated by the energy exchange.

7. The energy supply device according to claim 1, wherein a capacitor device is provided at an output terminal for the connecting of the appliance.

8. A method for operating an electrical energy supply device comprising: forming a busbar assembly comprising a busbar matrix comprising a first plurality of busbars comprising at least three different positive potentials and a second plurality of busbars comprising at least three different negative potentials; controlling an energy exchange between the energy supply device and an appliance, by: generating, buffering, and/or dynamically redistributing electrical energy via a plurality of usage units divided into a plurality of strands, wherein each strand comprises a positive potential end, a negative potential end, and a series circuit of usage units connected to one of the positive and negative potential ends across a respective DC voltage converter, wherein each strand is connected across a switching unit to the busbar assembly, the switching unit comprising a 1-to-N multiplexer which selects between pairs of the plurality of busbars to connect and disconnect the positive and negative potential ends to a selected busbar pair; and selecting, via a control device, at least one of the strands by a predetermined suitability criterion for the energy exchange and connecting each selected strand galvanically by switching of its first and
second switching units to those busbars leading to the appliance,
wherein adjacent strands are selectively connectable in series,
wherein the energy supply device further comprises a bidirectional AC/DC converter assembly connected to the busbar assembly for exchanging electrical energy with at least one of a supply grid and an AC energy source, and
wherein the control device is further configured to control, while at least one of the strands is discharged during the energy exchange, charging of at least one other of the strands across the bidirectional AC/DC converter assembly with the electrical energy from the supply grid or from the AC energy source.

* * * * *